(12) United States Patent
Cai

(10) Patent No.: US 7,885,661 B2
(45) Date of Patent: Feb. 8, 2011

(54) SYSTEMS AND METHODS FOR MOBILE VIRTUAL NETWORK OPERATOR MOBILE TO MOBILE SERVICE

(75) Inventor: Yigang Cai, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 902 days.

(21) Appl. No.: 11/624,963

(22) Filed: Jan. 19, 2007

(65) Prior Publication Data
US 2008/0176535 A1    Jul. 24, 2008

(51) Int. Cl.
H04W 40/00    (2009.01)
(52) U.S. Cl. .................. 455/445; 455/405; 455/406
(58) Field of Classification Search ......... 455/405–409, 455/418, 419, 414
See application file for complete search history.

(56) References Cited

U.S. PATENT DOCUMENTS

| | | | |
|---|---|---|---|
| 6,684,072 B1 * | 1/2004 | Anvekar et al. ......... | 455/432.1 |
| 2002/0091572 A1 * | 7/2002 | Anderson et al. ........... | 705/16 |
| 2004/0162058 A1 * | 8/2004 | Mottes ..................... | 455/411 |
| 2005/0074014 A1 | 4/2005 | Rao et al. | |
| 2005/0096021 A1 | 5/2005 | Benco et al. | |
| 2005/0113064 A1 | 5/2005 | Halsell | |
| 2005/0149416 A1 | 7/2005 | Benco et al. | |
| 2005/0159133 A1 | 7/2005 | Hasan et al. | |
| 2005/0216382 A1 | 9/2005 | Chambers et al. | |
| 2006/0058010 A1 * | 3/2006 | Williams et al. ......... | 455/414.1 |
| 2006/0264199 A1 | 11/2006 | Florkey et al. | |

FOREIGN PATENT DOCUMENTS

WO    WO 03103265 A1 *    12/2003

OTHER PUBLICATIONS

ISR, PCT/US2008/00480, Oct. 2005.
WO 03/103265, Dec. 11, 2003.

* cited by examiner

*Primary Examiner*—Charles N Appiah
*Assistant Examiner*—Kwasi Karikari
(74) *Attorney, Agent, or Firm*—Fay Sharpe LLP

(57) ABSTRACT

Call rating systems and methods using a mobile to mobile database with operator prefixes and a rating key table in which network operators subscribed to by mobile to mobile calling and called parties are identified by database queries and a rating key is obtained according to the prefixes to rate the call according to the rating key value representing agreed discounts for calls between subscribers of mobile network operators and mobile virtual network operators.

17 Claims, 7 Drawing Sheets

*FIG. 3A*

RATING KEY TABLE (120) — 100

| | CALLING PARTY PREFIX (114) | CALLING PARTY ROAMING (121) | CALLING PARTY HOME ZONE (122) | CALLED PARTY PREFIX (114) | CALLED PARTY ROAMING (123) | M2M RATING KEY (124) | DISCOUNT (126) |
|---|---|---|---|---|---|---|---|
| 120a1 | 001 | NO | N/A | 001 | NO | 001 | 100% |
| 120a2 | 001 | NO | N/A | 001 | YES | 002 | 100% |
| 120a3 | 001 | YES | N/A | 001 | NO | 003 | 100% |
| 120a4 | 001 | YES | N/A | 001 | YES | 004 | 100% |
| ⋮ | | | | | | | |
| 120b1 | 001 | NO | N/A | 002 | NO | 010 | 50% |
| 120b2 | 001 | NO | N/A | 002 | YES | 011 | 50% |
| 120b3 | 001 | YES | N/A | 002 | NO | 012 | 10% |
| 120b4 | 001 | YES | N/A | 002 | YES | 013 | 0% |
| ⋮ | | | | | | | |
| 120c1 | 001 | NO | N/A | 003 | NO | 020 | 70% |
| 120c2 | 001 | NO | N/A | 003 | YES | 021 | 20% |
| 120c3 | 001 | YES | N/A | 003 | NO | 022 | 10% |
| 120c4 | 001 | YES | N/A | 003 | YES | 023 | 0% |

FIG. 3B

RATING KEY TABLE (120)

| CALLING PARTY PREFIX (114) | CALLING PARTY ROAMING (121) | CALLING PARTY HOME ZONE (122) | CALLED PARTY PREFIX (114) | CALLED PARTY ROAMING (123) | M2M RATING KEY (124) | DISCOUNT (126) |
|---|---|---|---|---|---|---|
| 001 | NO  | N/A | 003 | NO  | 030 | 40% |
| 001 | NO  | N/A | 003 | YES | 031 | 20% |
| 001 | YES | N/A | 003 | NO  | 032 | 30% |
| 001 | YES | N/A | 003 | YES | 033 | 15% |
| 001 | NO  | N/A | 004 | NO  | 040 | 50% |
| 001 | NO  | N/A | 004 | YES | 041 | 0%  |
| 001 | YES | N/A | 004 | NO  | 042 | 25% |
| 001 | YES | N/A | 004 | YES | 043 | 0%  |

Rows: 120d1, 120d2, 120d3, 120d4, 120e1, 120e2, 120e3, 120e4

FIG. 3C

RATING KEY TABLE (120), 100

| | Calling Party Prefix (114) | Calling Party Roaming (121) | Calling Party Home Zone (122) | Called Party Prefix (114) | Called Party Roaming (123) | M2M Rating Key (124) | Discount (126) |
|---|---|---|---|---|---|---|---|
| 120f1 | 002 | NO | N/A | 001 | NO | 100 | 100% |
| 120f2 | 002 | NO | N/A | 001 | YES | 101 | 100% |
| 120f3 | 002 | YES | N/A | 001 | NO | 102 | 80% |
| 120f4 | 002 | YES | N/A | 001 | YES | 103 | 80% |
| 120g1 | 002 | NO | YES | 003 | NO | 120 | 80% |
| 120g2 | 002 | NO | YES | 003 | YES | 121 | 75% |
| 120g3 | 002 | NO | NO | 003 | NO | 122 | 60% |
| 120g4 | 002 | NO | NO | 003 | YES | 123 | 55% |
| 120g5 | 002 | YES | YES | 003 | NO | 124 | 25% |
| 120g6 | 002 | YES | YES | 003 | YES | 125 | 15% |
| 120g7 | 002 | YES | NO | 003 | NO | 126 | 0% |
| 120g8 | 002 | YES | NO | 003 | YES | 127 | 0% |

FIG. 3D

RATING KEY TABLE /120

| | CALLING PARTY PREFIX /114 | CALLING PARTY ROAMING /121 | CALLING PARTY HOME ZONE /122 | CALLED PARTY PREFIX /114 | CALLED PARTY ROAMING /123 | M2M RATING KEY /124 | DISCOUNT /126 |
|---|---|---|---|---|---|---|---|
| | ⋮ | | | | | | |
| 120h1 | 003 | NO | YES | 002 | NO | 210 | 40% |
| 120h2 | 003 | NO | YES | 002 | YES | 211 | 37% |
| 120h3 | 003 | NO | NO | 002 | NO | 212 | 30% |
| 120h4 | 003 | NO | NO | 002 | YES | 213 | 23% |
| 120h5 | 003 | YES | YES | 002 | NO | 214 | 13% |
| 120h6 | 003 | YES | YES | 002 | YES | 215 | 8% |
| 120h7 | 003 | YES | NO | 002 | NO | 216 | 0% |
| 120h8 | 003 | YES | NO | 002 | YES | 217 | 0% |
| | ⋮ | | | | | | |
| 120i1 | 003 | NO | YES | 003 | NO | 220 | 75% |
| 120i2 | 003 | NO | YES | 003 | YES | 221 | 65% |
| 120i3 | 003 | NO | NO | 003 | NO | 222 | 50% |
| 120i4 | 003 | NO | NO | 003 | YES | 223 | 20% |
| 120i5 | 003 | YES | YES | 003 | NO | 224 | 37% |
| 120i6 | 003 | YES | YES | 003 | YES | 225 | 33% |
| 120i7 | 003 | YES | NO | 003 | NO | 226 | 25% |
| 120i8 | 003 | YES | NO | 003 | YES | 227 | 10% |
| | ⋮ | | | | | | |

SYSTEMS AND METHODS FOR MOBILE VIRTUAL NETWORK OPERATOR MOBILE TO MOBILE SERVICE

BACKGROUND OF THE INVENTION

In the telecommunications industry, mobile telephone usage has increased dramatically through the construction and operation of mobile networks by mobile network operators (MNOs). Recently, mobile virtual network operators (MVNOs) have emerged as providers of cell phone services. The MVNOs typically do not own or operate the core communications network infrastructure, but instead contract with an MNO for the communications support while focusing on marketing to subscribers. MVNOs often have pre-established relationships with a certain customer base and are thus able to attract a new subscriber base for mobile communications services at a relatively low cost and risk, thereby providing an attractive partnership opportunity for MNOs to enhance resource utilization without high marketing costs normally associated with developing new subscribers. At the same time, such cooperative arrangements with MNOs provide the MVNO with a chance to enter the mobile market without significant initial investment and also to enhance their own branded services. In this manner, MVNOs and their agreements with MNOs are expected to create significant subscriber growth for the mobile communications industry as a whole. Discounted or free mobile to mobile calling is a feature offered by many MNOs for their subscribers, which provides an important incentive for attracting mobile subscribers. Thusfar, however, MVNO subscribers cannot obtain this service, as the MNO infrastructure does not allow for such selective discounting. Thus, there remains a need for improved communications systems and call rating techniques by which MVNO subscribers can be offered free or discounted mobile to mobile calling.

SUMMARY OF THE INVENTION

The following is a summary of one or more aspects of the invention provided in order to facilitate a basic understanding thereof, wherein this summary is not an extensive overview of the invention, and is intended neither to identify certain elements of the invention, nor to delineate the scope of the invention. The primary purpose of the summary is, rather, to present some concepts of the invention in a simplified form prior to the more detailed description that is presented hereinafter. Various aspects of the present disclosure involve mobile to mobile call rating in which the identity of the subscribed MNO or MVNO is ascertained for both mobile calling and called parties by accessing a centralized or distributed mobile to mobile (M2M) data store or database populated with data for subscribers of multiple network operators. Based on the subscribed network operator(s), a rating key value is obtained, such as from a table accessible by a rating component of a prepaid service element or postpaid billing system, where the key value indicates an agreed discount amount (e.g., 0% to 100% inclusive) to be applied for the corresponding pair of called party network operator and calling party network operator. In this manner, MVNOs can offer free or discounted mobile to mobile calling for inter-MVNO calls (e.g. calls between two subscribers of the same MVNO), intra-MVNO calls (e.g., calls from a mobile subscriber of a first MVNO to a subscriber of a second MVNO), and MNO subscribers can enjoy discounts for mobile to mobile calls to or from subscribers of different MNOs and/or MVNOs.

In accordance with one or more aspects of the present disclosure, a communications system is provided, having a network associated with a MNO that supports calls between mobile devices associated with subscribers of the MNO and mobiles of MVNO subscribers and/or of a different MNO. The system includes a mobile to mobile (M2M) data store that has entries for mobile subscribers of the MNO as well as entries for mobile subscribers of other network operator, whether an MVNO or an MNO. In one embodiment, the individual M2M data store entries include a network operator prefix indicating the network operator to which the corresponding mobile is subscribed, such that querying the data store for a given subscriber (e.g., by calling and called party numbers) yields a prefix for each party. The system also includes a first network element that obtains a call rating key based on the M2M data store entries for the calling and called party subscribers. In one possible implementation, a rating key table is provided which includes entries with rating key values for possible pairs of network operator prefixes, where the table may be included in the M2M data store, in a network call control function component, or elsewhere in the communications system. The rating key reflects an agreed rating for a call between the network operator(s) subscribed to by the calling and called parties, and is used for prepaid call service or postpaid billing systems to rate the call. The system may facilitate the provision of any number of discounts for mobile to mobile calling through MNO and MVNO network operator agreements such that a MNO will provision its M2M database or data store with entries of it's own subscribers and subscribers of one or more other operators (MNO and/or MVNO), where call rating components (whether for prepaid or post paid M2M calls) can obtain the operator prefix(es) associated with the parties to a given call and check a rating key table to determine the discount agreed upon by the network operator(s). Different key values can be negotiated for a given pair of prefixes, moreover, to set different discounts according to the roaming status of the calling and/or called party, as well as for the calling party home zone status.

Further aspects of the disclosure are associated with a call rating system for rating a mobile to mobile call. The rating system includes a first network element that obtains a call rating key that indicates an agreed rating for calls between parties that are each subscribed to a first or second network operator, as well as a rating component that rates a call between the calling and called party subscribers at least partially according to the call rating key. The operators may be two MNOs or at least one of the operators can be a MVNO. In one example, the first network element includes an M2M data store with an entry for a first mobile subscriber of the first mobile network operator with a network operator prefix indicative of the first mobile network operator and an entry for a second mobile subscriber of the second mobile network operator with a network operator prefix indicative of the second mobile network operator, as well as a rating key table including entries with a rating key value for possible pairs of network operator prefixes. In certain implementations, moreover, the call rating key is obtained at least partially according to a roaming status of one or both subscribers, and/or according to one subscriber's home zone status.

In accordance with other aspects of the present disclosure, a method is provided for rating a mobile to mobile call. The method includes obtaining a call rating key indicative of an agreed rating for M2M calls between a calling party subscriber of either a first or a second mobile network operator, and a called party subscriber of the first or second operators. The method further provides for rating a call between the calling and called party subscribers at least partially according to the call rating key. In one implementation, the method further includes determining a roaming status and/or a home zone status of at least one of the calling and called party subscribers, and rating the call accordingly. The method may also include querying an M2M data store to obtain network operator prefix values corresponding to the mobile network operators of the calling and called party subscribers, and obtaining a rating key corresponding to the network operator prefix values.

BRIEF DESCRIPTION OF THE DRAWINGS

The following description and drawings set forth in detail certain illustrative implementations of the invention, which are indicative of several exemplary ways in which the principles of the invention may be carried out. Various objects, advantages, and novel features of the invention will become apparent from the following detailed description of the invention when considered in conjunction with the drawings. The present invention may be embodied in the construction, configuration, arrangement, and combination of the various system components and acts or events of the methods, whereby the objects contemplated are attained as hereinafter more fully set forth, specifically pointed out in the claims, and illustrated in the accompanying drawings in which:

FIGS. 3A-3D are schematic diagrams illustrating further details of the exemplary call rating key table in the system of FIG. 1;

DETAILED DESCRIPTION

Figure 1:
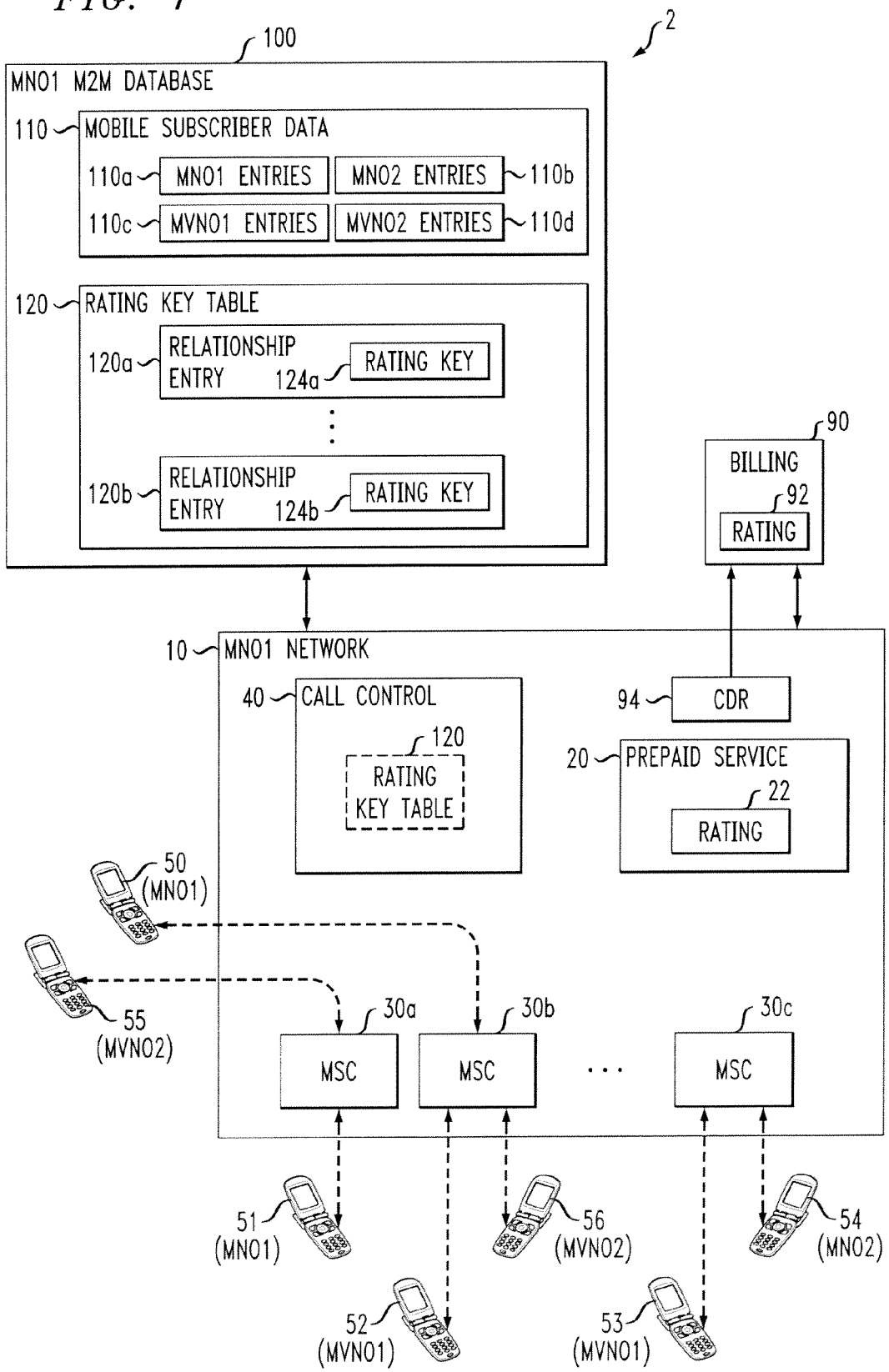
FIG. 1 is a schematic diagram illustrating an exemplary communications system and call rating system thereof with a mobile to mobile database having mobile subscriber data entries and a rating key table in accordance with one or more aspects of the present disclosure.

Referring now to the figures, wherein the showings are for purposes of illustrating the exemplary embodiments only and not for purposes of limiting the claimed subject matter, FIG. 1 schematically illustrates an exemplary communications system 2 comprising a network 10 operated by a mobile network operator MNO1 into which the presently described embodiments may be incorporated or in which various aspects of the disclosure may be implemented. Several embodiments or implementations of the various aspects of the present disclosure are hereinafter illustrated and described in conjunction with the drawings, wherein like reference numerals are used to refer to like elements throughout and wherein the figures are not necessarily drawn to scale. The illustrated system 2 can be any type of packet switched and/or circuit switched telecommunications environment for supporting mobile to mobile calling by and between mobile communications devices 50-56, wherein the network 10 can include any number of components, sub-networks, etc., which interoperate to support communications, including without limitation CDMA (code division multiple access), TDMA (time division multiple access), GSM (Global System for Mobile communications), and IMS type networks. In one embodiment, the illustrated network 10 includes a prepaid service component 20 with a rating engine 22, one or more switch elements such as MSCs 30 and call control elements 40 along with associated VLRs, HLRs, and other associated components (not shown) for call processing and control as are known, as well as a billing system 90 with a rating engine 92 to support post paid calling services in the illustrated example.

The communication system 2 may include various operationally interconnected networks of various topologies, including wireless network components along with PSTN and packet switched (IP) networks (not shown) through which calls may be placed between mobile units 50-56 and other devices that are currently served by the MNO1 network 10 or by other networks (not shown). For mobile to mobile calls, the network 10 supports calls to, from, and/or between the exemplary mobiles 50-56 shown in FIG. 1 via a given one of the MSCs 30a, 30b, and 30c. The network 10 may further provide one or more home location registers (HLRs, not shown) operatively associated with the MSCs 30 for storing various subscriber information, device status, the subscriber's mobile directory number, subscribed features selected by the subscriber as part of the mobile service plan, and information regarding the location of mobiles that may have roamed and registered with other (serving) MSCs. The system 2, moreover, may include various other components and elements (not shown), for providing telecommunications services to a multitude of wireless and wireline communications devices, wherein only certain exemplary elements are illustrated in FIG. 1 so as not to obscure the described aspects of the present invention.

In general, the various components of the system 2 and the network 10 communicate with one another using one or more protocols as are known for providing mobile communications for exchanging voice, data, video or any other information exchanged between various communications devices such as the illustrated mobiles 50-56, which may include wireless terminals to access network services over a radio interface and may be portable units, phones or computers installed in a vehicle, etc. The network 10 of the first MNO is operative to support calls to, from, and/or between mobile devices 50 and 51 associated with subscribers of the mobile network operator MNO1, as well as mobiles 52, 53, 55, and 56 associated with subscribers of one or more MVNOs and a mobile 54 subscribed to another MNO2. In this regard, the network 10 can support mobile to mobile calling or any number of mobile devices that are subscribed to any number of MNOs and MVNOs, wherein only several devices 50-56 are illustrated in FIG. 1 in order to avoid obscuring the various aspects of the present disclosure.

For mobile to mobile calls involving mobile devices 50-56 that are processed by the network 10 of operator MNO1, the system 10 in one embodiment includes a mobile to mobile (M2M) database 100 with mobile subscriber data 110, and one or more rating key tables 120 incorporated in the M2M database 100 or in the network call control function element 40, in one or more of the MSCs 30, or which may be implemented elsewhere in operative association with the network 10. The M2M database 100 and the rating key table are operable in conjunction with rating engines or components 22, 92 of the prepaid service 20 and the postpaid billing system 90 to provide one exemplary embodiment of a call rating system for rating mobile to mobile calls in accordance with one or more aspects of the present disclosure. The M2M database 100 can be implemented as any suitable form of data store that can be searched or queried, and which can be implemented as a unitary data store or a distributed or replicated data store that is operatively associated with the network 10 and accessible by elements thereof. Similarly, the rating key table 120 can be implemented as any searchable database or data store accessible by network components, and which may be unitary or distributed, for instance, where the rating key table entries and key values thereof may be replicated among two or more network elements for access in association with call rating operations with respect to mobile to mobile calls. In the exemplary embodiments, moreover, the M2M database subscriber entries 110 and the entries of the rating key table 120 are provisioned and maintained by the first mobile network operator MNO1.

Figure 2:
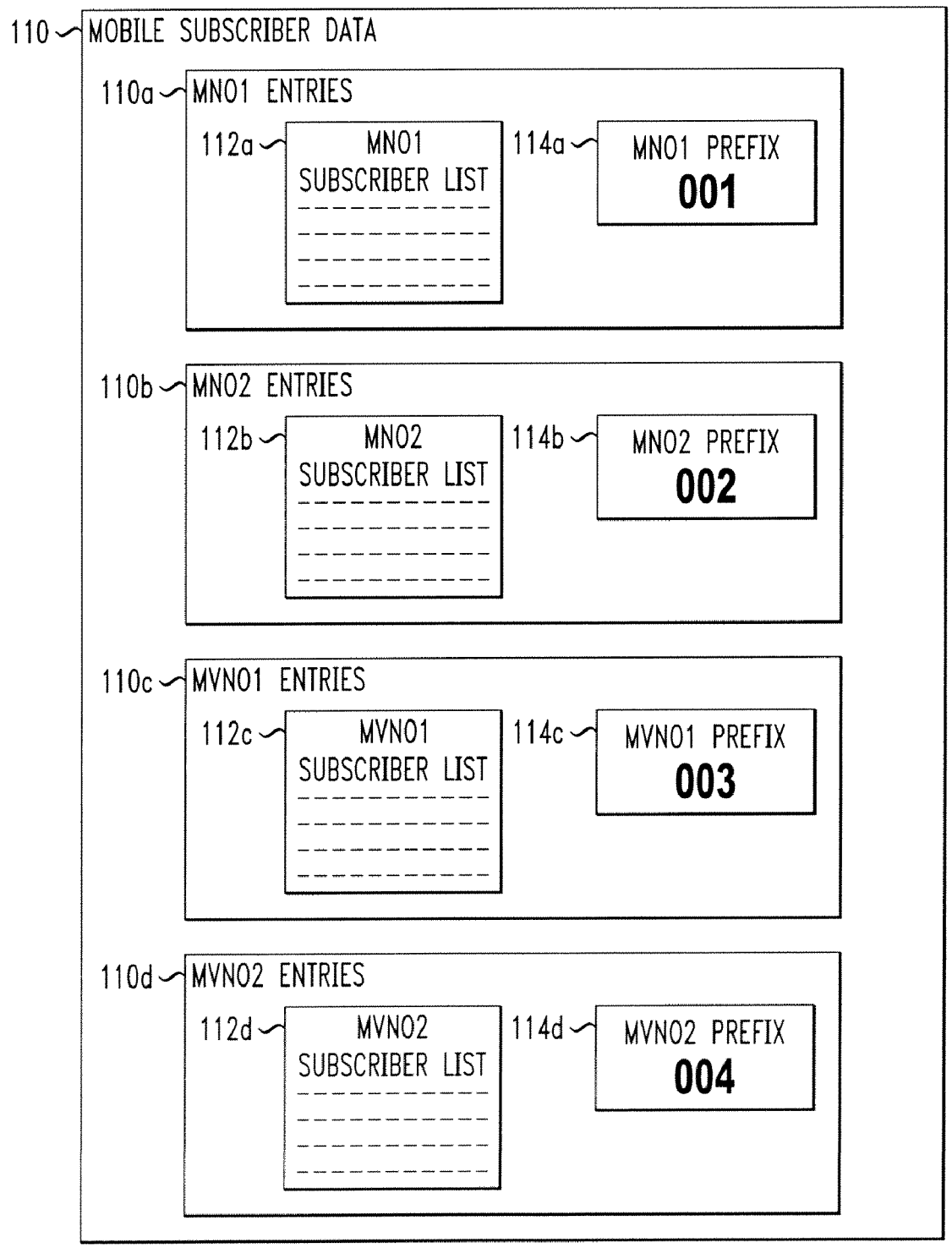
FIG. 2 is a schematic diagram illustrating further details of the exemplary M2M database in the system of FIG. 1.

As best shown in FIGS. 1 and 2, the exemplary M2M database 100 includes mobile subscriber data 110 including various entries 110a for mobile subscribers of MNO1 as well as entries 110b for subscribers to a second MNO2, entries 110c for mobile subscribers of the first MVNO1 and mobile subscriber entries 110d for subscribers of a second exemplary MVNO2. In general, the M2M data store 100 may include any number of entries for subscribers of a given network operator, and may include entries for subscribers to any number of MNO and/or MVNO operators in accordance with the present disclosure. In the illustrated example, moreover, the entries 110 provide a correlation between individual mobile subscriber indicia 112 and a network operator prefix 114 indicative of the identity of a specific network operator whether a mobile network operator or a mobile virtual network operator. For instance, FIG. 2 illustrates exemplary subscriber data entries 11a for subscribers to the operator MNO1, including a list 112a of MNO1 subscribers, such as a list of the phone numbers or any other globally unique indicia associated with a given MNO1 mobile subscriber (e.g., the phone numbers of MNO1 subscriber phones 50 and 51 in FIG. 1). Each such entry 112a for MNO1 mobiles either includes the MNO1 prefix 114a or provides a pointer or other association to the prefix 114a. Similarly, the data store data 110 includes entries 110b with a list 112b of subscribers to MNO2 mapping to an associated operator prefix 114b, as well as MVNO1 entries 110c with subscriber list 112c and prefix 114c and MVNO2 entries 110d with subscriber list 112d and prefix 114d.

In the illustrated embodiment, the individual M2M data store entries 110 include the operator prefix 114 indicating the network operator to which a corresponding listed mobile is subscribed, such that querying the data store 100 for a given subscriber of one of the lists 112 (e.g., by calling and called party numbers in servicing a prepaid call or in rating a postpaid call) yields the associated prefix 114. Similar searches are preferably performed for each party to a given mobile to mobile call, whereby the call control function 40, or the MSCs 30, or the prepaid service function component 20 and the rating engine 22 thereof can determine an M2M status for parties to a prepaid call to initially ascertain whether the call is an M2M call, and if so, to ascertain the identity of the operator to which each party is subscribed in real time. This M2M status indication is also used by the billing service 90 and the rating engine 92 thereof in rating a postpaid call based on information (e.g. calling and called party phone numbers) derived from a call CDR 94. In one example for a mobile to mobile call between two subscribers 50 and 51 of MNO1 (FIG. 1), the querying entity will obtain the prefix 114a (001 in this example) for both the calling and called party numbers, and will know by the successful query that both subscribers are mobile. In another example for a call from an MVNO1 mobile 52 to the MNO1 subscriber 51, the calling party query of the subscriber data will yield the MVNO1 prefix 114b (002 in the example) and the called party query yields the MNO1 prefix 114a.

Referring now to FIGS. 1 and 3A-3D, the call rating system also includes one or more entities, such as the rating engines 22, 92, or the MSCs 30 or other network element that obtains a call rating key 124 based on the M2M data store entries 110 for the calling and called party subscribers, where the key 124 can be any number, code, or other data that represents a discount agreed upon by the relevant network operator or operators for a mobile to mobile call between the corresponding subscribers. In the illustrated embodiment, a rating key table 120 is provided in one or both of the M2M database 100 or the call control function 40 or elsewhere in operative association with the network 10 (e.g., in one or more of the MSCs 30, etc.). In certain implementations, if an MSC 30 obtains the rating key 124 based on the calling and called party prefix(es) 114 for postpaid calls, the MSC 30 can include the key value 124 in the CDR 94 for the billing system 90 to rate the call directly, and if the MSCs 30 are themselves provisioned with the data 110, 120 of an M2M data store 100, the MSC can determine the M2M status of a call and obtain the rating key 124 directly without consulting or querying a separate M2M database 100. Moreover, where the M2M database 100 includes both the provisioned subscriber entries 110 and the rating key table 120, the data store 100 can return a rating key value 124 directly in response to a single query specifying the called and calling party numbers for a mobile to mobile call.

As best shown in FIGS. 3A-3D, the table 120 includes entries 120a-120i with a rating key value 124 for possible pairs of calling and called party network operator prefixes 114. The rating key 124 reflects a rating number or value, such as a discount amount from 0% to 100% inclusive for a call between the network operator(s) subscribed to by the calling and called parties as determined by the respective network operator or as negotiated between the corresponding pair of operators. In this regard, different keys 124 can be provided for each combination of calling and called party numbers (and other parameters such as roaming status, home zone status, etc., as discussed further below), or certain keys may be shared (e.g. appearing twice in the table 120) when two or more such combinations yield the same discount amount (e.g., where two combinations both provide for a 10% discount), wherein the present disclosure contemplates all such alternate implementations and variants thereof and is not limited to the specifically illustrated examples.

The key 124 is utilized in the exemplary embodiments for prepaid call service 20 or postpaid billing systems 90 to rate the call in association with other rating values or parameters, such as by simply multiplying the rating key value 124 by a calculated tariff amount otherwise normally applied to a call. In this manner, the call rating system of the present disclosure facilitates provisioning of any number of discounts for mobile to mobile calling through MNO and MVNO network operator agreements such that an MNO will provision its M2M database or data store with entries of it's own subscribers and subscribers of one or more other operators (MNO and/or MVNO), where call rating components (such as the rating engines 22, 92, etc., whether for prepaid or post paid M2M calls) and/or other call service components (e.g., the MSCs 30, the call control function 40, the prepaid service 20, etc.) can obtain the operator prefix(es) associated with the parties to a given call and check a rating key table 120 to determine the discount agreed upon or determined by the corresponding network operator(s).

Different key values can be negotiated for a given pair of prefixes, moreover, to set different discounts according to the roaming status of the calling and/or called party, as well as according to the calling party home zone status. In this respect, the exemplary table 120 of FIGS. 3A-3D provides individual searchable entries 120a-120i that individually include a pair of calling and called party prefixes 114 and an M2M call rating key 124 representing a discount amount 126, and may further optionally include indicia for calling party roaming status 121, calling party home zone status 122, and/or called party roaming status 123. In this manner, the network operators, whether conventional MNOs or associated MVNOs can offer particularized discounts for a variety of calling conditions and situations to better serve the subscribers. For example, the operators may decide that discounted mobile to mobile service will not be made available if a caller is outside of their defined home zone (e.g., a "NO" indication 122) or is roaming (e.g., a "YES" indication 121 in the table 120 of FIGS. 3A-3D). In another example, lower discounting may be applied when the called party is roaming (e.g., "YES" indication 123).

The rating key provision, moreover, may take into account any number of other such calling conditions, where the present disclosure is not limited to the examples shown in the figures, and a rating key table 120 may include any number of such columns and rows to accommodate any agreed upon rating or discount system envisioned by one or more network operators to provide any granularity of discount options related to mobile to mobile call situations. In this manner, the present disclosure accommodates provision of selectively discounted mobile to mobile calling for intra-MNO, intra-MVNO, and inter-MVNO calls, as well as for calls between MNO and MVNO subscribers, and may contemplate selective discounts for calls involving more than two mobiles. FIGS. 3A-3D show several exemplary sets of rating key table entries to further illustrate the expansive flexibility afforded by the present disclosure with respect to MNO and MVNO M2M call discounting, where these examples are clearly not exhaustive of all possible implementations of the present disclosure.

As shown in FIGS. 3A-3C, the operator MNO1 can provision any desired discount conditions for M2M calls to, from, or between its own subscribers, wherein the entries 120a1-120a4 in FIG. 3A indicate preferential 100% discount rates (free calling) between mobiles subscribed to MNO1, regardless of roaming or home zone status, using rating key values 001, 002, 003, and 004, each representing 100% discount. It is noted in this regard, that alternative implementations could replace these four entries 120a1-120a4 with a single entry with a single key value 124 in which the roaming and home zone indicators 121, 122, and 123 all reflect don't-care or not-applicable conditions, such as "N/A". The entries 120b1-120b4 in FIG. 3A show one set of possible agreed discount rates for M2M calls from MNO1 subscribers (calling party prefix 114=001) to MNO2 subscribers (called party prefix 114=002) in which the operators MNO1 and MNO2 have agreed to provide 50% discount if the caller is not roaming. In this example, if the caller is roaming, a 10% discount is provided if the called party is not roaming and a 0% (no discount) applies if both parties are roaming. For calls from an MNO1 subscriber (calling party prefix 114=001) to subscribers of MVNO1 (called party prefix 114=003), the entries 120c1-120c4 in FIG. 3A indicate another negotiated discount arrangement in which a 70% discount applies when neither party is roaming (entry 120c1), and lower discounts are indicated by the key values 124 for various roaming conditions (again regardless of home zone status).

FIG. 3B illustrates further exemplary entries 120d and 120e, wherein calls from MNO1 subscribers to called parties that subscribe to MVNO1 (entries 120d1-120d4) or to MVNO2 subscribers (entries 120e1-120e4) are discounted differently based on the roaming status of the calling and called parties, where the discounts for calls to the MVNO1 customers are different than those to the MVNO2 subscribers. Calls from MNO2 subscribers to MNO1 subscribers are shown in entries 120f1-120f4 in FIG. 3C, in which free calling is provided for non-roaming callers and 80% discounts apply for roaming callers, regardless of the roaming status of the MNO1 called party subscribers, and regardless of caller home zone status. Entries 120g1-120g8 illustrate an example in which calling party home zone status is factored into the discounting scheme implemented via the present disclosure, wherein calls from MNO2 subscribers to subscribers of MVNO1 subscribers (called party prefix 114=003) are discounted more when the caller is in his or her home zone (indicator 122=YES) compared to situations where the MNO2 caller is away from the home zone (indicator 122=NO). FIG. 3D shows further examples of possible negotiated call rating key values for calls between MVNO subscribers, wherein entries 120h1-120h8 show discounts for MVNO2 callers and MVNO1 called parties with discount values that depend on roaming and home zone status, and entries 120g1-120g8 show somewhat higher discount rates for calls between subscribers of MVNO2, again depending on the roaming and home zone status conditions.

Figure 4:
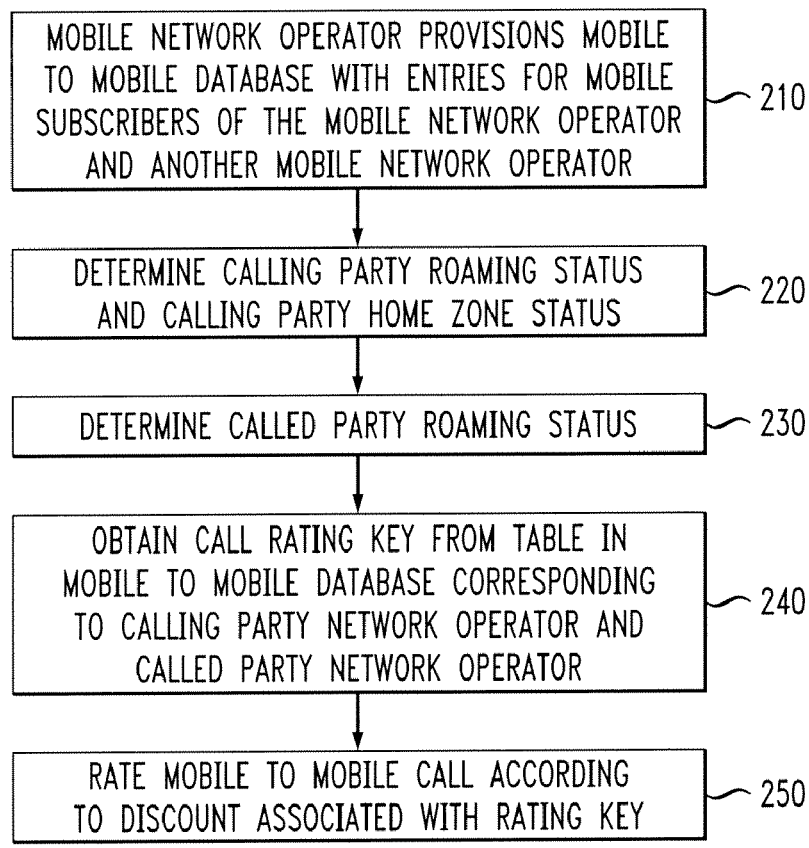
FIG. 4 is a flow diagram illustrating an exemplary mobile to mobile call rating methodology that includes obtaining a call rating key corresponding to network operators associated with calling and called party mobile subscribers in accordance with the present disclosure.
Figure 5:
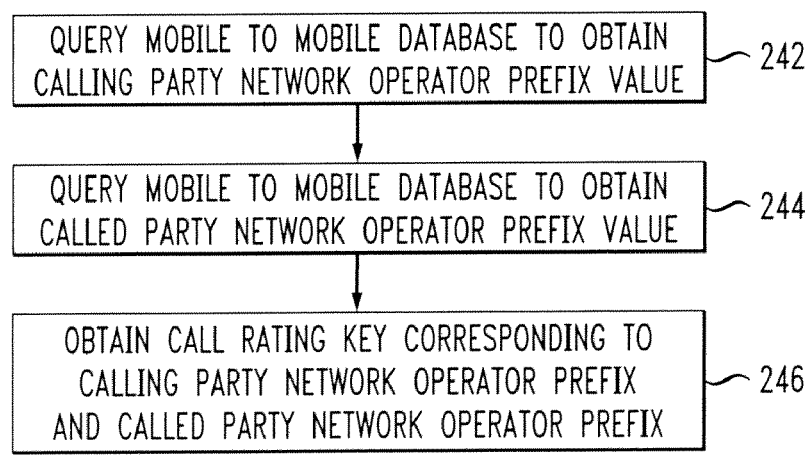
FIG. 5 is a flow diagram illustrating an exemplary technique for obtaining a call rating key in the method of FIG. 4 by querying an M2M database to obtain operator prefixes of the called and calling party operators, and obtaining the call rating key according to the operator prefix(es).

Referring now to FIGS. 4 and 5, FIG. 4 illustrates an exemplary mobile to mobile call rating method 200 in accordance with the present disclosure including obtaining a call rating key corresponding to network operators associated with calling and called party mobile subscribers, and FIG. 5 depicts an exemplary technique for obtaining a call rating key in the method 200. The method 200 generally includes obtaining a call rating key representing an agreed rating for calls between a calling party mobile subscribed to either a first or a second mobile network operator and a called party mobile subscriber of one of the first and second mobile network operators, as well as rating a call between the calling and called parties at least partially according to the call rating key. Although the method 200 is illustrated and described in the form of a series of acts or events, it will be appreciated that the various methods of the invention are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present invention. The illustrated method 200 and other methods of the invention may be implemented in hardware, software, or combinations thereof, in order to provide the mobile to mobile call rating services in any form or type of communications system such as those illustrated and described above, although the invention is not limited to the specific applications and implementations illustrated and described herein.

Beginning at 210 in FIG. 4, the mobile network operator (MNO) associated with a communications network provisions a mobile to mobile data store (e.g., M2M database 100 discussed supra) with entries for mobile subscribers of the MNO and subscribers of at least one other network operator, whether another MNO or an MVNO. A calling party mobile roaming status and the caller's home zone status are optionally determined at 220, and the called party's roaming status is determined at 230. At 240, a call rating key is obtained from the provisioned M2M database corresponding to the network operator(s) subscribed to by the calling and called parties, wherein the rating key can be obtained from a rating key table that is part of the M2M database or separate therefrom. The mobile to mobile call is rated at 250 at least partially according to a discount associated with the call rating key. Referring also to FIG. 5, in one possible implementation of the call rating key acquisition at 240, the M2M data store is queried at 242 to obtain a network operator prefix value associated with the calling party subscriber's network operator, and the data store is queried at 244 to obtain the operator prefix for the called party mobile subscriber. In this example, a call rating key is then obtained at 246 which corresponds to the calling and called party network operator prefixes.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein. It is also to be appreciated that particular elements or components described herein may have their functionality suitably implemented via hardware, software, firmware, logic, and/or combinations thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate. In short, the present specification has been set forth with reference to preferred embodiments and modifications and alterations are possible and enabled upon reading and understanding the present specification, wherein the invention contemplates all such modifications and alterations insofar as they come within the scope of the appended claims or the equivalents thereof. Moreover, regarding the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A communications system, comprising:
a network associated with a mobile network operator and operative to support calls between mobile devices associated with subscribers of the mobile network operator and mobile devices associated with subscribers of a mobile virtual network operator;
a mobile to mobile data store operatively associated with the network, the mobile to mobile data store comprising entries for mobile subscribers of the mobile network operator and entries for mobile subscribers of the mobile virtual network operator;
a first network element that obtains a call rating key indicative of an agreed rating for a call between calling party and called party subscribers of one or both of the mobile network operator and the mobile virtual network operator according to the entries in the mobile to mobile data store for the calling and called party subscribers, the call rating key including a value indicating a discount amount either determined by a network operator to which both the calling party and called party are subscribed or agreed to by first and second mobile operators to which the calling party and called party are subscribed, respectively; and
a rating component operatively associated with the network that rates the call at least partially according to the call rating key;
wherein the mobile to mobile data store further comprises entries for mobile subscribers of another mobile network operator and wherein the first network element is operative to obtain a rating key according to the entries in the mobile to mobile data store for the mobile subscribers of the other mobile network operator and another mobile subscriber; and
wherein the mobile to mobile data store further comprises entries for mobile subscribers of another mobile virtual network operator and wherein the first network element is operative to obtain a rating key according to the entries in the mobile to mobile data store for the mobile subscribers of the other mobile virtual network operator and another mobile subscriber.

2. The system of claim 1, wherein the call is a prepaid call and wherein the rating component is operatively associated with a prepaid service component of the network.

3. The system of claim 1, wherein the call is a postpaid call and wherein the rating component is operatively associated with a billing system.

4. The system of claim 3, wherein the first network element is operatively associated with the billing system.

5. The system of claim 1, wherein the individual entries of the mobile to mobile data store comprise a network operator prefix indicative of the network operator to which the corresponding mobile subscriber is subscribed.

6. The system of claim 5, wherein the first network element comprises a rating key table including entries with a rating key value for possible pairs of network operator prefixes.

7. The system of claim 6, wherein the rating key table is included in the mobile to mobile data store.

8. The system of claim 1, wherein the first network element comprises a rating key table including entries with a rating key value for possible pairs of network operators.

9. The system of claim 8, wherein the rating key table is included in the mobile to mobile data store.

10. The system of claim 1, wherein the first network element obtains a call rating key according to the entries in the mobile to mobile data store for the calling party and called party mobile subscribers and according to a roaming status of at least one of the calling party and called party mobile subscribers.

11. The system of claim 1, wherein the first network element obtains a call rating key according to the entries in the mobile to mobile data store for the calling party and called party mobile subscribers and according to a home zone status of the calling party mobile subscriber.

12. A call rating system for rating a mobile to mobile call, comprising:
   a first network element that obtains a call rating key indicative of an agreed rating for calls between a calling party mobile subscriber of one of a first mobile network operator and a second mobile network operator and a called party mobile subscriber of one of the first mobile network operator and the second mobile network operator, the call rating key including a value indicating a discount amount either determined by one of the first mobile network operator and the second mobile network operator to which both the calling party and called party are subscribed or agreed to by two of the first mobile network operator and the second mobile network operator to which the calling party and called party are subscribed, respectively, wherein at least one of the first and second mobile network operators is a mobile virtual network operator; and
   a rating component operatively associated with the network that rates a call between the calling party and called party subscribers at least partially according to the call rating key;
   wherein the first network element comprises:
      a mobile to mobile data store comprising:
         an entry for a first mobile subscriber of the first mobile network operator with a network operator prefix indicative of the first mobile network operator, and
         an entry for a second mobile subscriber of the second mobile network operator with a network operator prefix indicative of the second mobile network operator; and
      a rating key table including entries with a rating key value for possible pairs of network operator prefixes.

13. The system of claim 12, wherein the first network element obtains a call rating key at least partially according to a roaming status of at least one of the subscribers.

14. The system of claim 12, wherein the first network element obtains a call rating key at least partially according to a home zone status of at least one of the subscribers.

15. A method for rating a mobile to mobile call, the method comprising:
   querying a mobile to mobile data store to obtain network operator prefix values corresponding to the mobile network operators to which the calling and called party subscribers are subscribed;
   obtaining a rating key corresponding to the network operator prefix values, the call rating key being indicative of an agreed rating for calls between a calling party mobile subscriber of one of a first mobile network operator and a second mobile network operator and a called party mobile subscriber of one of the first and second mobile network operators, wherein at least one of the first and second mobile network operators is a mobile virtual network operator, and the call rating key including a value indicating a discount amount either determined by one of the first mobile network operator and the second mobile network operator to which both the calling party and called party are subscribed or agreed to by two of the first mobile network operator and the second mobile network operator to which the calling party and called party are subscribed, respectively; and
   rating a call between the calling party and called party subscribers at least partially according to the call rating key.

16. The method of claim 15, further comprising:
   determining a roaming status of at least one of the calling and called party subscribers; and
   rating the call at least partially according to the call rating key and the roaming status.

17. The method of claim 15, further comprising:
   determining a home zone status of the calling party subscriber; and
   rating the call at least partially according to the call rating key and the home zone status.

* * * * *